United States Patent
Nanda

(10) Patent No.: US 12,439,300 B2
(45) Date of Patent: Oct. 7, 2025

(54) MOBILITY EFFICIENCY FOR BANDWIDTH REDUCED MOBILE DEVICES

(71) Applicant: AT&T Mobility II LLC, Atlanta, GA (US)

(72) Inventor: Gulshan Nanda, Frisco, TX (US)

(73) Assignee: AT&T Mobility II LLC, Atlanta, GA (US)

(*) Notice: Subject to any disclaimer, the term of this patent is extended or adjusted under 35 U.S.C. 154(b) by 736 days.

(21) Appl. No.: 17/472,929

(22) Filed: Sep. 13, 2021

(65) Prior Publication Data
US 2023/0077812 A1   Mar. 16, 2023

(51) Int. Cl.
| | |
|---|---|
| H04W 36/00 | (2009.01) |
| H04W 48/10 | (2009.01) |
| H04W 48/12 | (2009.01) |
| H04W 48/16 | (2009.01) |

(52) U.S. Cl.
CPC .... H04W 36/0061 (2013.01); H04W 36/00835 (2018.08); H04W 48/10 (2013.01); H04W 48/12 (2013.01); H04W 48/16 (2013.01)

(58) Field of Classification Search
CPC ..... H04W 48/12; H04W 48/16; H04W 72/23; H04W 48/02; H04W 72/51; H04W 48/08; H04W 4/70; H04W 48/10; H04W 48/18
See application file for complete search history.

(56) References Cited

U.S. PATENT DOCUMENTS

2009/0247159 A1* 10/2009 Flore .................... H04W 24/02
                                                                    455/434
2022/0361059 A1* 11/2022 He ..................... H04W 36/00835

* cited by examiner

Primary Examiner — Nam T Huynh
(74) Attorney, Agent, or Firm — Guntin & Gust, PLC; John G. Rauch

(57) ABSTRACT

The disclosed technology is directed towards an efficient way for a bandwidth reduced mobile device/user equipment to select a bandwidth reduced neighbor cell for connecting thereto. A first data structure, such as a system information block 4 or 5 (SIB4 or SIB5) is to be mapped to a corresponding bandwidth reduced system information block 4 or 5 (SIB4-BR or SIB5-BR) data structure. The network device performing the mapping obtains information of which neighbor cells are capable of supporting bandwidth reduced mobile devices. In a filtering operation, only information of the bandwidth reduced capable neighbor cells are mapped and sent to the bandwidth reduced mobile device. The bandwidth reduced mobile device thus only scans bandwidth capable neighbors, rather than a full set of neighbor cells. A bandwidth reduced capability indicator can be obtained as part of neighbor cell capability data, or a neighbor cell can be queried for such information.

20 Claims, 10 Drawing Sheets

MOBILITY EFFICIENCY FOR BANDWIDTH REDUCED MOBILE DEVICES

TECHNICAL FIELD

The subject application relates to wireless communications systems in general, and more particularly to cellular wireless communications, including mobility efficiency for bandwidth reduced mobile devices.

BACKGROUND

Certain mobile devices (user equipment or UE) such as long term evolution category M (LTE-M) mobile devices are significant contributors to users of Internet of Things (IoT) services. To support these devices, connectivity, and mobility, operators provide service availability on a selected carrier, such as 700 MHz. These devices operate on bandwidth reduced mode, sometimes shortened to "band-reduced mode," which means such mobile devices cannot scan wider than a 1.4 MHz carrier.

To support these devices on any regular carrier of more than 5 MHz, system information is relayed with the scanable area of the band for these mobile devices, and this system information is band reduced system information mode. In this process, regular UE system information is straightforwardly mapped to band-reduced system information blocks (SIBs). This creates an inefficiency, because such devices (e.g., LTE-M or Category M1 UEs) can only read the 1.4 Mhz portion of the band and only use the carriers that support this band's reduced service requirement.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
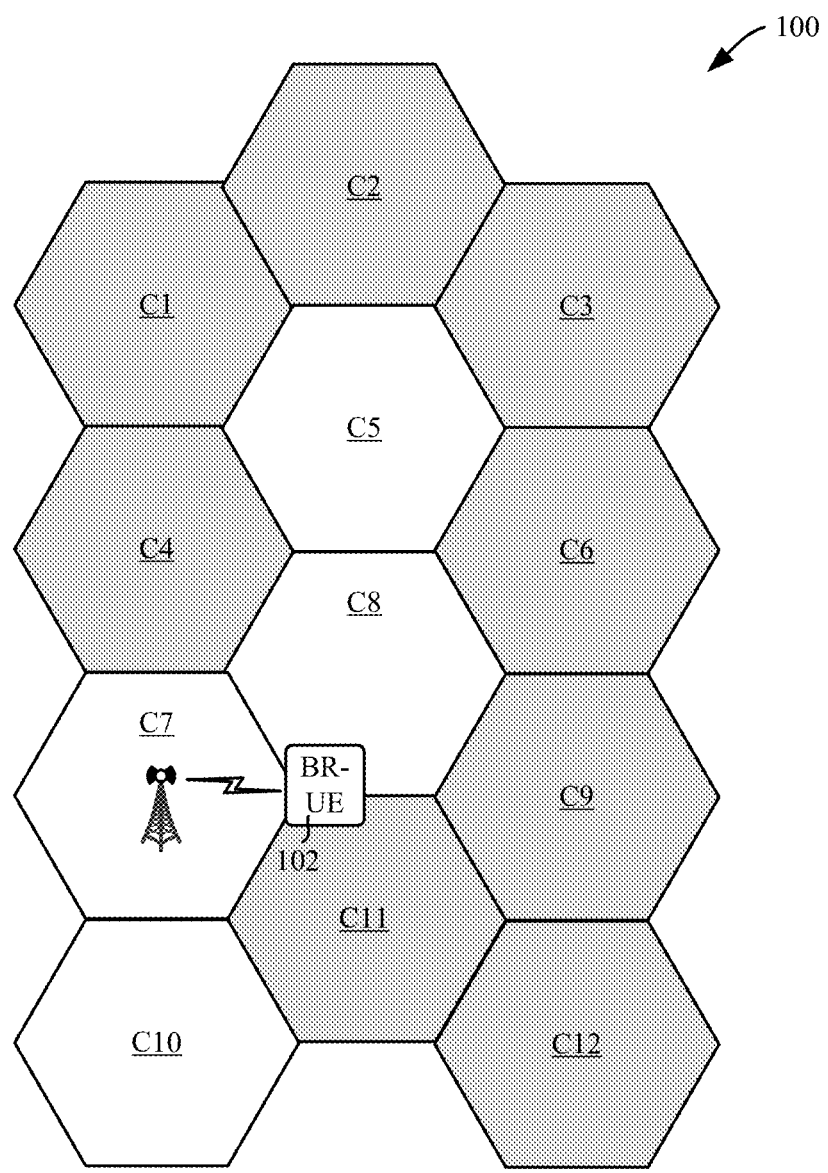
FIG. 1 is a block diagram illustrating an example wireless communication system containing bandwidth reduced capable cells and non-capable cells, in accordance with various aspects and embodiments of the subject disclosure.

The technology described herein is generally directed towards sending filtered system information blocks that are bandwidth reduced (SIB-BRs) to bandwidth reduced mobile devices/bandwidth reduced user equipment (BR-UE). At present, regular SIBs are mapped generally straightaway to the SIBs-BR (SIBs Band reduced); as such, a bandwidth reduced mobile device obtains a full list of neighbor cells in the SIBs-BR received thereby, including neighbor cells that do not support bandwidth reduced mode. When a bandwidth reduced mobile device needs to connect to a neighbor cell, the bandwidth reduced mobile device scans up to the entire list of neighbors, one-by-one, to select a neighbor cell to which to connect, even though often many of those scanned are not be capable of reduced bandwidth support. Depending upon the number of neighbors included in the SIB data structure, the mobile device's scanning can be highly inefficient.

In contrast, the technology described herein filters out the neighbor cells that do not support bandwidth reduced operation. As a result, the SIBs band reduced that are received by a bandwidth reduced mobile device only contains those neighbor cells that do support bandwidth reduced operation. This provides numerous benefits, including that a BR-UE is able to attach to the network faster, BR-UE battery life is enhanced, and the SIB-BR data structures are smaller resulting in less load on the physical downlink control channel (PDCCH), with the saved bandwidth available for use with other services.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, can be utilized interchangeably in the application, and can refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user equipment," "device," "communication device," "mobile device," "subscriber," "customer entity," "consumer," "customer entity," "entity" and the like may be employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, including, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.11 wireless technologies and/or legacy telecommunication technologies.

As shown in the example system 100 of FIG. 1, a bandwidth reduced (BR) mobile device (user equipment, or BR-UE) 102 is connected to a cell C7, which has a number of neighbor cells C1-C6 and C8-C12 in this simplified example. Further, in the example system, consider that the shaded cells (C1-C4, C6, C9, C11 and C12) do not support bandwidth reduced mode. Instead of receiving the information of the full set of neighbor cells C1-C6 and C8-C12, the SIBs that contain neighbor information (SIB4-BR for intra-frequency neighbors, e.g., up to sixteen, and SIB5-BR for inter-frequency neighbors, e.g., up to sixteen, only list the subset of cells that support reduced bandwidth, which are only C5, C8 and C10 in this example. When the BR-UE 102 needs to connect to one of the neighbors, such as when waking up from a dormant state and discovering that the cell C7 is not available for reselection, only the relevant reduced bandwidth-capable neighbors are contained in the SIBs (SIB4 and SIB5), whereby the BR-UE 102 only needs to scan and select from this reduced subset (C5, C8 and C10) of neighbor cells, saving significant resources of both the BR-UE and network bandwidth.

There are various techniques to eliminate this prior system inefficiency, including, but not limited to, manual radio frequency (RF) planning and optimization, whereby, for example, an LTE-M capable cell already knows of its neighbors and their LTE-M capabilities (or not). Given the many neighbor cells that can, and often do, change over time, manual planning and optimization is relatively and significantly inefficient.

Figure 2A:
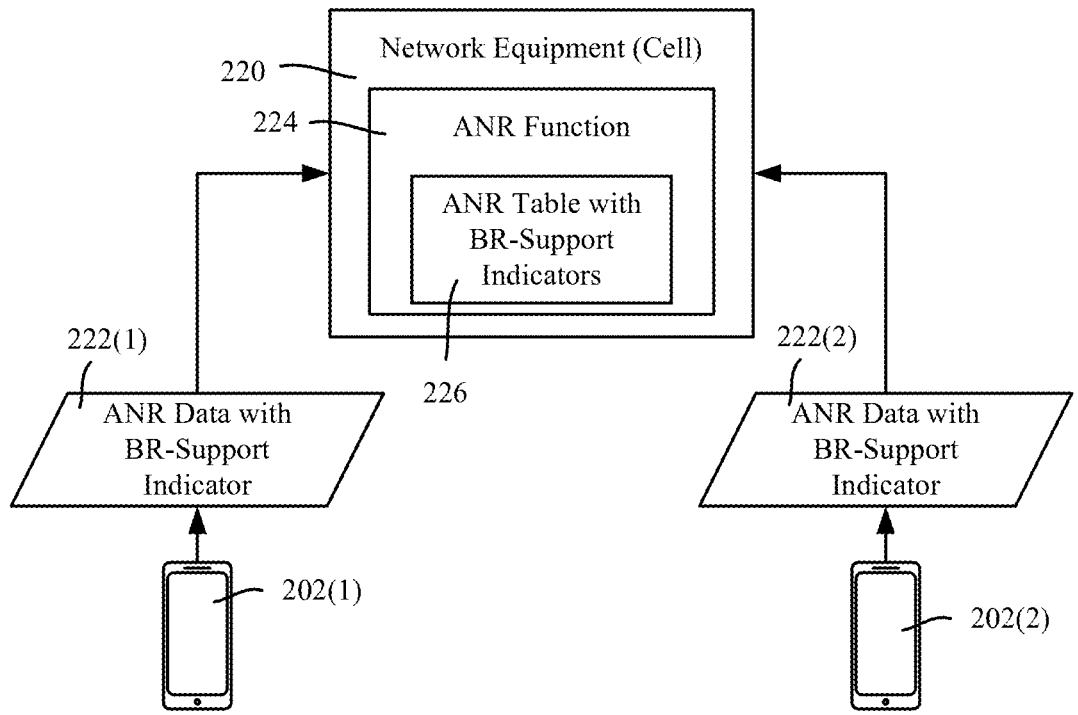
FIG. 2A is a block diagram representing data and components by which a network device obtains a bandwidth reduced capability indicator of neighbor cells, in accordance with various aspects and embodiments of the subject disclosure.

FIG. 2A shows another technique, in which a BR-capability indicator is included in the capability data (e.g., neighbor relation details) received when information of a neighbor cell is obtained, such as received from a UE in automatic neighbor relation (ANR) procedure. As is known, ANR provides a way for network equipment 230 corresponding to a cell to learn information of its neighbor cells from UEs; e.g., in FIG. 2A the UE 202(1) provides information 222(1) about that UE's detected neighbor cells, the UE 202(2) provides information 222(2) about that UE's detected neighbor cells, and so on. An ANR function 234 in (or coupled to) the network equipment 230 maintains the received information in an ANR data structure (e.g., table 236), which is useful for handovers and other operations.

By extending the information sets 222(1) and 222(2) to include a BR-capability indicator for each neighbor cell, the network equipment 220 possesses this information for each neighbor cell in the ANR table (or maintained elsewhere). The BR-capability indicator can be a single bit, e.g., a BR-capability indicator set to one in a neighbor cell indicates BR-capable, a BR-capability indicator of zero in a neighbor cell's data indicates not BR-capable. Other ways to provide such a BR-capability indicator can be employed, including having an indicator (e.g., in an optional field) for a BR-capable neighbor cells, and not having any indicator for a BR-capable neighbor cells.

When the network device is mapping the neighbor-relevant SIBs to SIBs-BR (SIB4-BR and SIB5-BR), the BR-capability indicator can be used to filter out the non-BR-capable cells and only include the BR-capable cells. Note that it is alternatively feasible to map the SIBs to the SIBs-BR as is currently done, with some follow-up processing to remove (exclude) the non-BR-capable neighbor cells from the SIB s-BR. In any event, a BR-UE receives only the subset of BR-capable neighbor cells to which the BR-UE can connect.

Figure 2B:
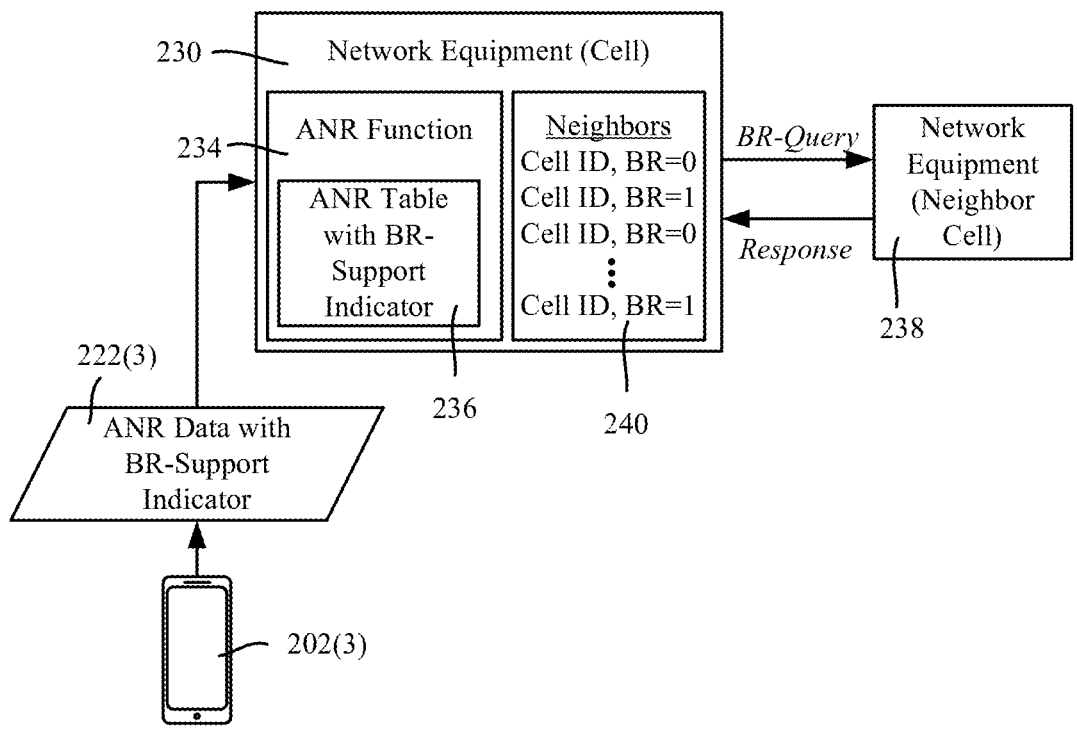
FIG. 2B is a block diagram representing data and components by which a network device queries for bandwidth reduced capability information of a neighbor cell, in accordance with various aspects and embodiments of the subject disclosure

FIG. 2B shows another alternative, in which network equipment 230 similarly learns of neighbor cells in some way, e.g., again via an automatic neighbor relation (ANR) procedure from neighbor data 222(3) received from a UE 202(3). In this example, the ANR function 234 updates an AMR table 236 as usual. However, (whether performed by the ANR function or another component of the network equipment 230), when a new neighbor cell is detected, the network equipment 230 queries the new neighbor cell for its bandwidth reduced capability. In this way, the network equipment can similarly filter out non-bandwidth reduced capable cells when mapping the SIB4 to SIB4-BR data structure and the SIBS to SIB5-BR data structure.

In this example, the neighbor bandwidth reduced capability indicator/data is shown as being maintained in a separate data structure 240, but it is also feasible to update the ANR table 236 as appropriate based on the response. Further, if desired, only the bandwidth reduced capable neighbor cells need be listed in the data structure 240; if not in the data structure, do not add to the corresponding SIB (SIB-4BR or SIB5-BR) when mapping.

It should be noted that a hybrid approach can be used even with BR-capability indicator obtained with the neighbor information, such as in the example of FIG. 2A. For example, if a relevant specification/standard did not allow extending the ANR table, the indicator can be maintained as a cell ID or in association with a cell ID in a separate data structure as in FIG. 2B. As long as the bandwidth reduced capability data can be obtained in some way by the network equipment, the SIB-4BR or SIB5-BR mapping, with filtering, can enhance efficiency as described herein.

Figure 3:
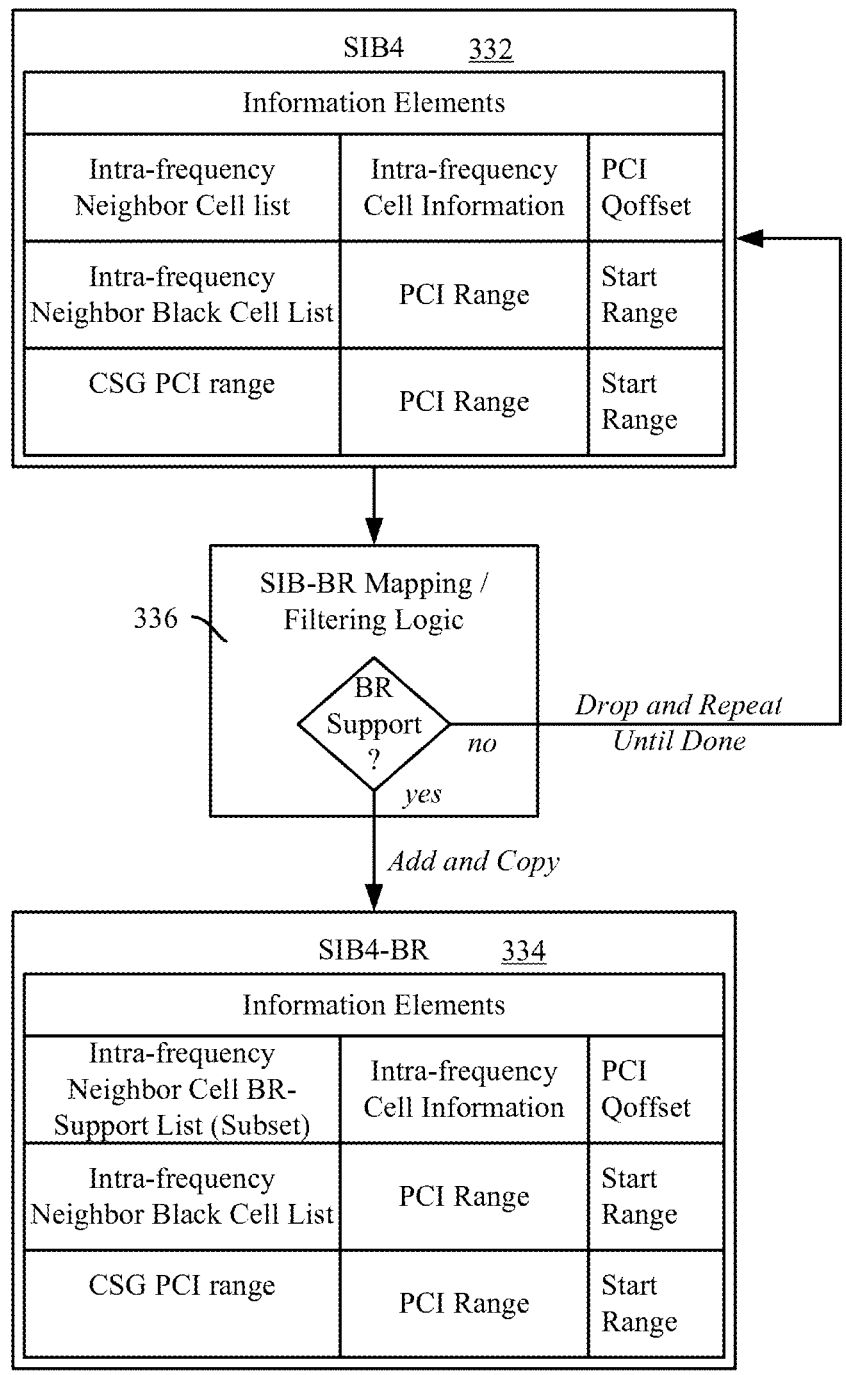
FIG. 3 is a representation of data structures and logic by which a cell maps or filters out information of neighbor cells from a system information block 4 (SIB4) data structure to a SIB4-BR (bandwidth reduced) data structure based on bandwidth reduced support data, in accordance with various aspects and embodiments of the subject disclosure.

FIG. 3 shows an example of mapping a SIB4 data structure 332 to a SIB4-BR data structure 334; (a SIB5 data structure can be similarly mapped, with filtering as described herein, to a SIB5-BR data structure, and thus is not separately described for purposes of brevity). In the example of FIG. 3, SIB-BR mapping/filtering logic 336 includes a decision block. If, for each neighbor cell in the SIB4 data structure 332, the neighbor cell supports bandwidth reduced devices, the neighbor cell and its other information is mapped (added/included/copied) to the SIB4-BR data structure 334. Otherwise, the neighbor cell and its related information is filtered out/not mapped to the SIB4-BR data structure 334. Unless all neighbor cells are bandwidth reduced capable, the SIB4 data structure 332 contains a reduced subset of the neighbor cells. Note that it would be feasible to add such non-BR-capable neighbors to the black cell list, or flag in some other way, but this would not reduce (or possibly increase with a per-neighbor flag) the amount of data relative to that currently sent in a SIB-BR data structure.

Figure 4:
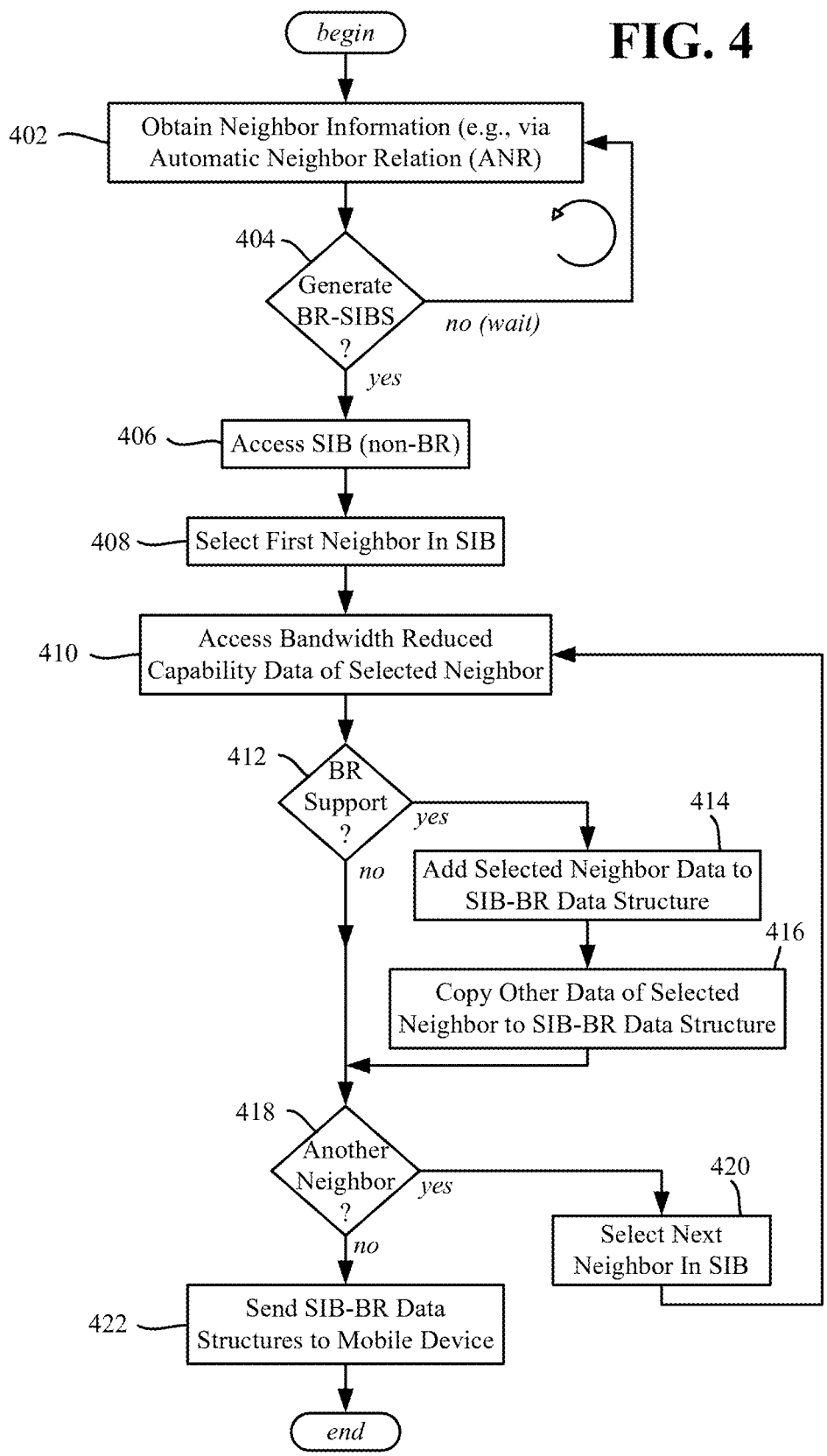
FIG. 4 is a flow diagram representing example operations of a network device to map (or filter out) SIB neighbor cell information to a SIB-BR data structure based on bandwidth reduced support data of each neighbor cell, in accordance with various aspects and embodiments of the subject disclosure.

FIG. 4 is a flow diagram showing example operations of SIB-BR mapping/filtering logic. The logic operates to include neighbors that support bandwidth reduced mode/exclude neighbors that do not support bandwidth reduced mode with respect to either SIB4 or SIBS mapping to SIB4-BR or SIB5-BR data structures, or both (with corresponding information mapped for each data structure type). Note that FIG. 4 assumes that the SIB4 and SIBS data structures are accessible.

In this example, operation 402 of FIG. 4 represents the network device/equipment obtaining the neighbor information, which includes a bandwidth reduced support/non-support indicator. This can be obtained via a query, by automatic neighbor relation, or in some other suitable way. Operation 404 represents continuing to collect neighbor data until a bandwidth reduced data structure needs to be mapped/generated for a mobile device.

Operation 406 represents accessing the regular SIB data structure(s), with operation 408 selecting the first neighbor listed therein. Operation 410 accesses the bandwidth reduced capability data of the selected neighbor cell, whether part of a larger capability dataset, or via a separate data structure. If the selected neighbor cell is bandwidth reduced (BR) capable, operations 414 and 416 map the SIB4 data for the selected cell to the SIB4-BR data structure. Otherwise, operations 414 and 416 are bypassed by the filtering logic.

Operations 418 and 420 repeat the operations for each other neighbor cell in the source list (e.g., the SIB4 or SIBS data structure(s) being mapped. When no neighbor cells remain to process (map or not), operation 422 represents sending the SIB4-BR and SIB5-BR data structures to the bandwidth reduced mobile device.

Figure 5:
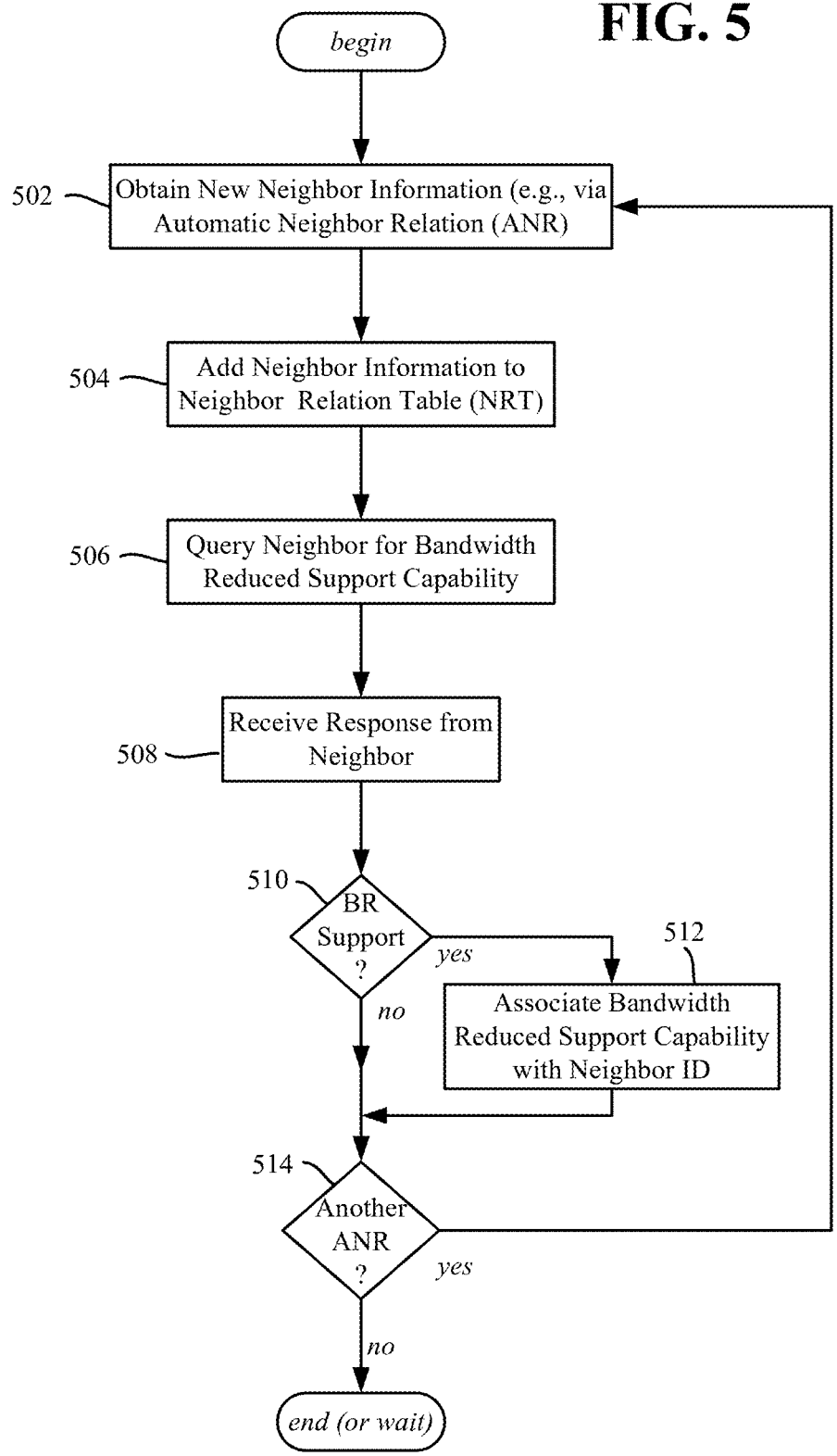
FIG. 5 is a flow diagram representing example operations of a network device to query a neighbor cell for bandwidth reduced capability information, in accordance with various aspects and embodiments of the subject disclosure.

FIG. 5 is a flow diagram showing example operations related to querying a neighbor cell for its bandwidth reduced (BR) capability, beginning at operation 502 where the network device/equipment learns about the existence of a neighbor cell. This can, for example, be via ANR, at which time the ANR data table is updated via operation 504.

In this example, the neighbor cell's bandwidth reduced (BR) capability data is not yet known, whereby operation 506 queries the neighbor cell for such information. Further in this example, the neighbor cell responds at operation 508.

If reduced bandwidth is supported at operation 510, operation 512 associates this capability with the neighbor cell ID or the like. Otherwise the operation 512 is skipped) although it is feasible to maintain the non-support with this cell ID so as to avoid querying again should it again be re-identified in some way as a new neighbor.

Operation 514 repeats the process for another ANR, as it is understood that information of multiple new neighbor cells can be received generally at the same time for processing. Note that instead parallel or substantially parallel instances of the logic of FIG. 5 can be performed for multiple new neighbors; parallel operation is particularly valuable relative to having to wait for one neighbor's response before querying another neighbor for a response.

It should be noted that with the querying alternative, querying can be deferred until the mapping occurs. For example, returning to FIG. 4, instead of accessing existing data at operation 410, operation 410 can perform a query/handle a response at that time. Again, parallel processes/threads corresponding to instances of FIG. 4 can make this more efficient, rather than waiting for each response before processing the next neighbor.

Figure 6:
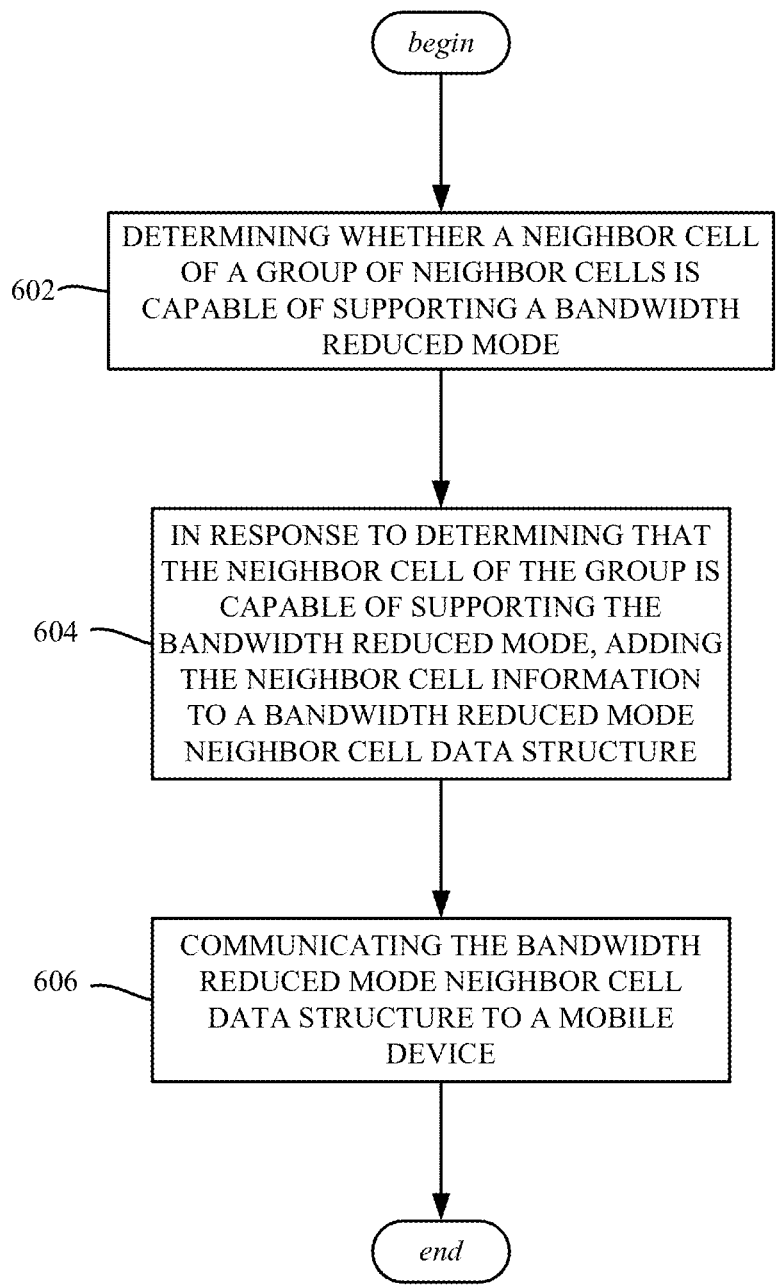
FIG. 6 is a flow diagram representing example operations related to adding reduced bandwidth neighbor cell data to a reduced bandwidth data structure, in accordance with various aspects and embodiments of the subject disclosure.

One or more example aspects are represented in FIG. 6, and can correspond to a processor, and a memory that stores executable instructions that, when executed by the processor, facilitate performance of operations. Example operation 602 represents determining whether a neighbor cell of a group of neighbor cells is capable of supporting a bandwidth reduced mode. Operation 604 represents, in response to determining that the neighbor cell of the group is capable of supporting the bandwidth reduced mode, adding the neighbor cell information to a bandwidth reduced mode neighbor cell data structure. Operation 606 represents communicating the bandwidth reduced mode neighbor cell data structure to a mobile device.

The bandwidth reduced mode neighbor cell data structure can include a system information block. The bandwidth reduced mode neighbor cell data structure can include at least one of: a system information block 4 bandwidth reduced data structure or a system information block 5 bandwidth reduced data structure.

Determining whether the neighbor cell of the group of neighbor cells is capable of supporting the bandwidth reduced mode can include evaluating a bandwidth reduced mode capability indicator in capability data associated with the neighbor cell. Further operations can include obtaining the bandwidth reduced mode capability indicator as part of a neighbor relation procedure.

Determining whether the neighbor cell of the group of neighbor cells is capable of supporting the bandwidth reduced mode can include querying the neighbor cell.

The mobile device can be a long term evolution category m mobile device.

Figure 7:
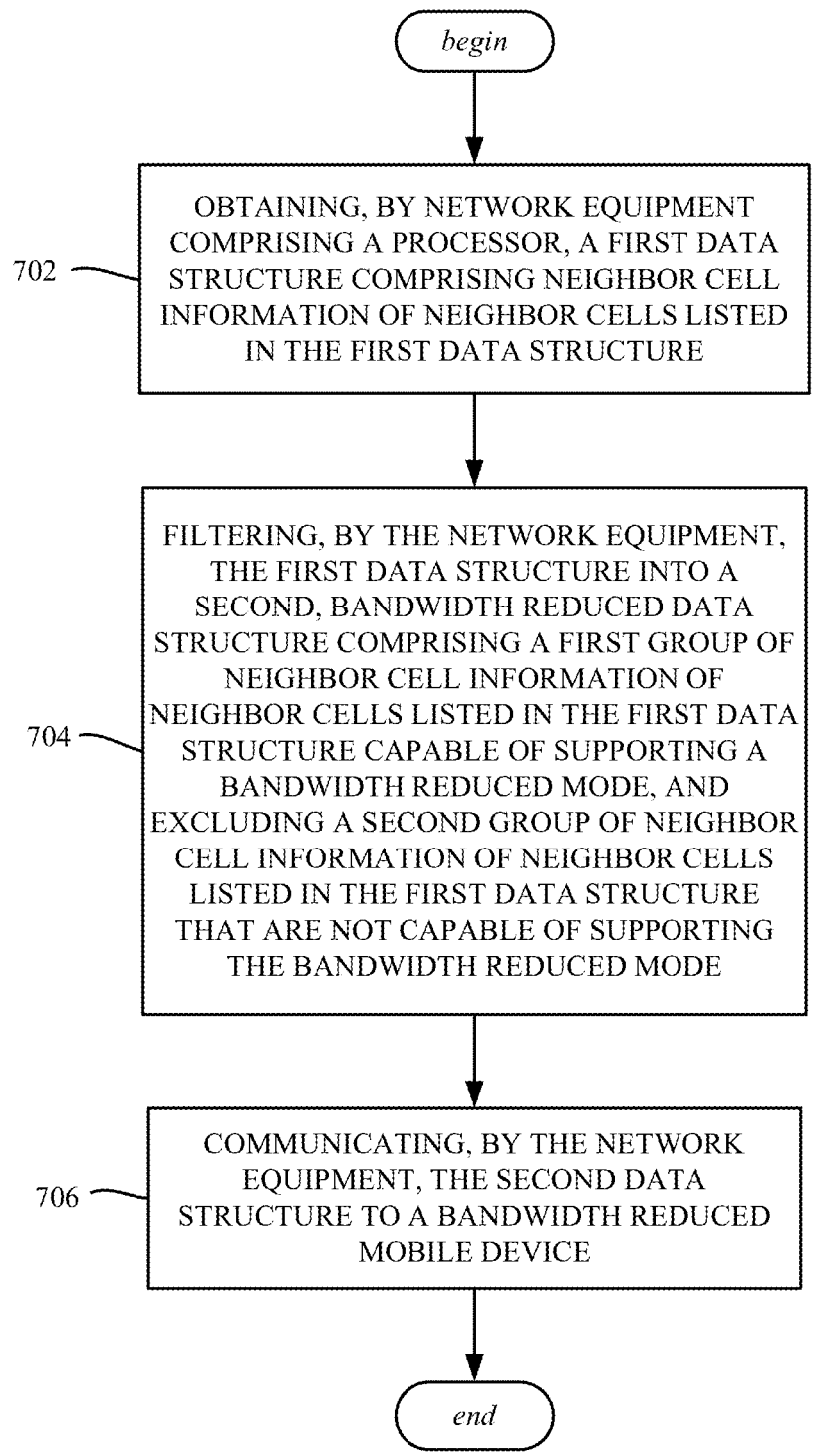
FIG. 7 is a flow diagram representing example operations related to obtaining reduced bandwidth neighbor cell data for use in mapping/filtering a reduced bandwidth data structure, in accordance with various aspects and embodiments of the subject disclosure.

One or more example aspects are represented in FIG. 7, and can correspond to operations, e.g., of a method. Operation 702 represents obtaining, by network equipment comprising a processor, a first data structure comprising neighbor cell information of neighbor cells listed in the first data structure. Operation 704 represents filtering, by the network equipment, the first data structure into a second, bandwidth reduced data structure comprising a first group of neighbor cell information of neighbor cells listed in the first data structure capable of supporting a bandwidth reduced mode, and excluding a second group of neighbor cell information of neighbor cells listed in the first data structure that are not capable of supporting the bandwidth reduced mode. Operation 706 represents communicating, by the network equipment, the second data structure to a bandwidth reduced mobile device.

Filtering the first data structure into the second, bandwidth reduced data structure can include evaluating neighbor cell bandwidth reduced capability data of the neighbor cells listed in the first data structure.

Aspects can include obtaining, by the network equipment, the bandwidth reduced capability data of the neighbor cells listed in the first data structure as part of a neighbor relation procedure.

Filtering of the first data structure into the second, bandwidth reduced data structure can include evaluating respective bandwidth reduced capability indicators of respective neighbor cells listed in the first data structure.

Aspects can include obtaining, by the network equipment, the bandwidth reduced capability data of the neighbor cells listed in the first data structure as part of a neighbor relation procedure.

Aspects can include querying, by the network equipment, the neighbor cells listed in the first data structure to obtain respective bandwidth reduced capability data of respective neighbor cells listed in the first data structure.

Filtering of the first data structure into the second, bandwidth reduced data structure can correspond to mapping a system information block 4 data structure to a system information block 4 bandwidth reduced data structure. Filtering of the first data structure into the second, bandwidth reduced data structure corresponds to mapping a system information block 5 data structure to a system information block 5 bandwidth reduced data structure.

Figure 8:
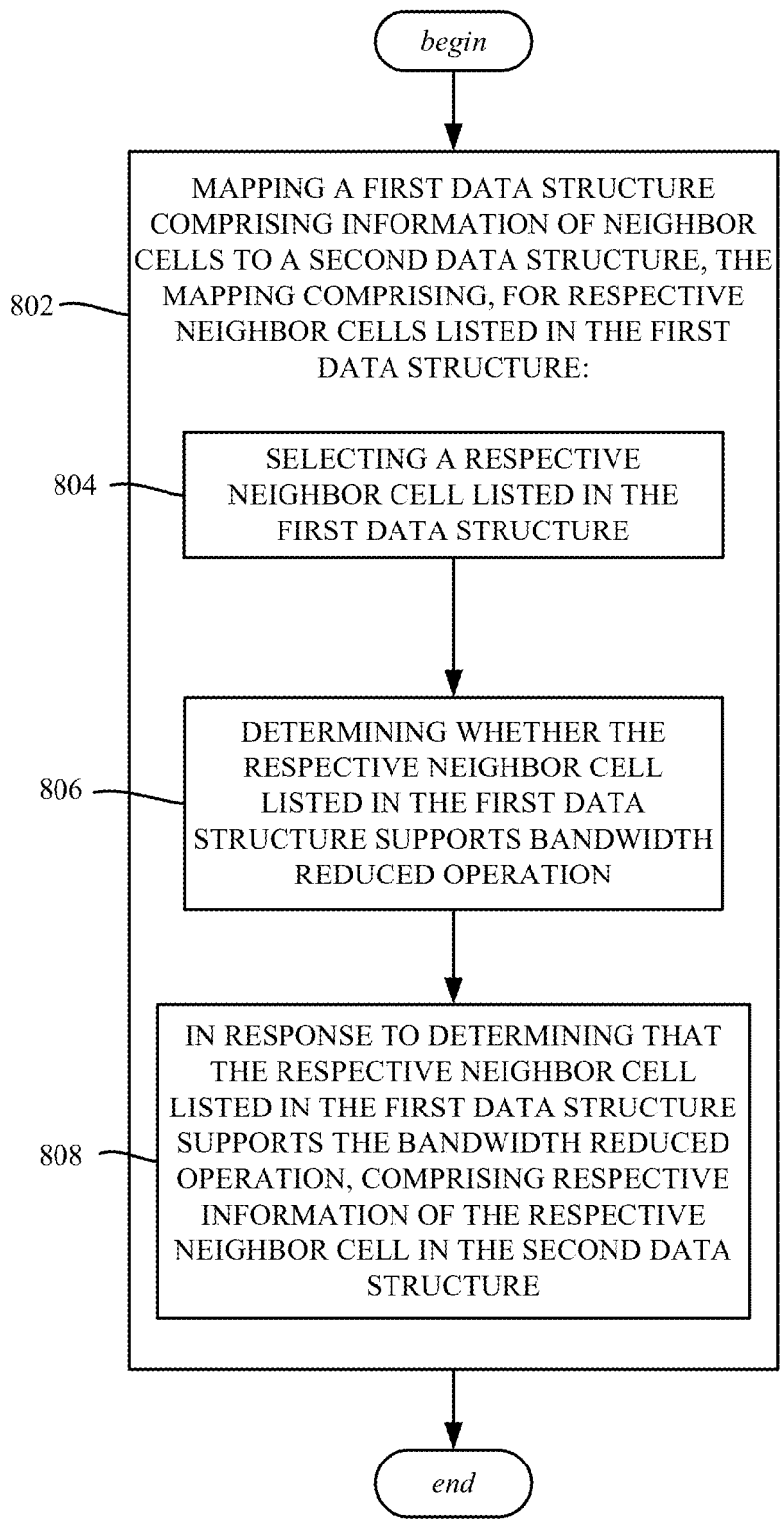
FIG. 8 is a flow diagram representing example operations of mapping a first data structure comprising information of neighbor cells to a second data structure, in accordance with various aspects and embodiments of the subject disclosure.

One or more aspects are represented in FIG. 8, such as implemented in a machine-readable medium, comprising executable instructions that, when executed by a processor, facilitate performance of operations. Example operation 802 represents mapping a first data structure comprising information of neighbor cells to a second data structure, the mapping comprising, for respective neighbor cells listed in the first data structure. Operation 804 represents selecting a respective neighbor cell listed in the first data structure. Operation 806 represents determining whether the respective neighbor cell listed in the first data structure supports bandwidth reduced operation. Operation 808 represents, in response to determining that the respective neighbor cell listed in the first data structure supports the bandwidth reduced operation, adding respective information of the respective neighbor cell in the second data structure.

Determining whether the respective neighbor cell listed in the first data structure supports the bandwidth reduced operation can include evaluating a reduced bandwidth capability indicator associated with the respective cell. Further operations can include communicating the second data structure to a reduced bandwidth mobile device.

Mapping of the first data structure to the second data structure can include mapping a system information block 4 data structure to a system information block 4 bandwidth reduced data structure.

Mapping of the first data structure to the second data structure can include mapping a system information block 5 data structure to a system information block 5 bandwidth reduced data structure.

As can be seen, described ins a technology by which bandwidth reduced SIBs corresponding to neighbor cell information only include neighbor cells that do support bandwidth reduced operation. As a result, a bandwidth reduced mobile device only scans those neighbor cells to which they are capable of connecting. In this way, a bandwidth reduced mobile device is able to attach to the network faster, bandwidth reduced mobile device battery life is enhanced, the SIB-BR data structures are generally smaller, resulting in less load on the PDCCH, and so on.

Turning to aspects in general, a wireless communication system can employ various cellular systems, technologies, and modulation schemes to facilitate wireless radio communications between devices (e.g., a UE and the network equipment). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system are particularly described wherein the devices (e.g., the UEs and the network equipment) of the system are configured to communicate wireless signals using one or more multi carrier modulation schemes, wherein data symbols can be transmitted simultaneously over multiple frequency subcarriers (e.g., OFDM, CP-OFDM, DFT-spread OFDM, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system can be configured to provide and employ 5G wireless networking features and functionalities. With 5G networks that may use waveforms that split the bandwidth into several sub-bands, different types of services can be accommodated in different sub-bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

Figure 9:
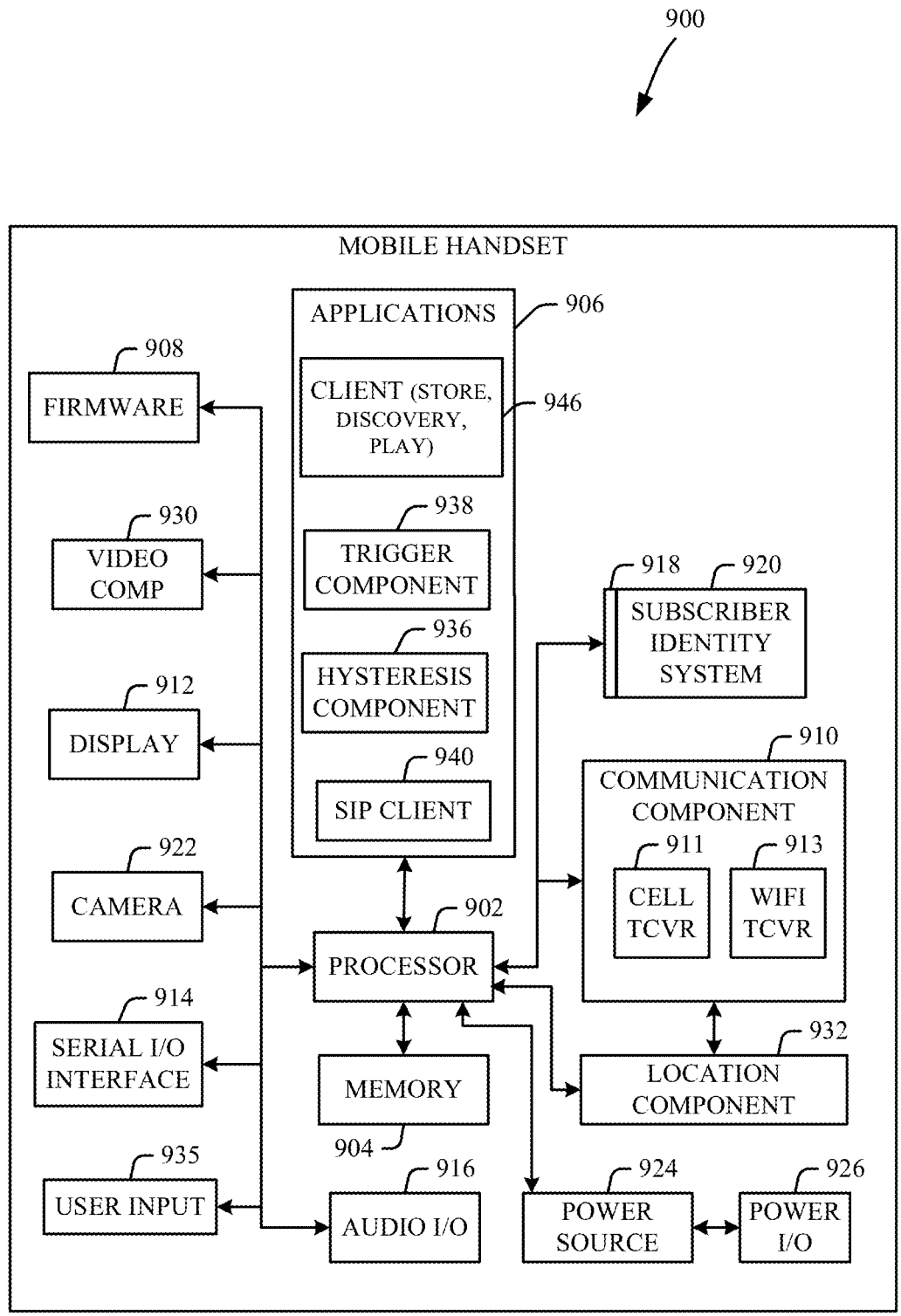
FIG. 9 illustrates an example block diagram of an example mobile handset operable to engage in a system architecture that facilitates wireless communications according to one or more embodiments described herein.

Referring now to FIG. 9, illustrated is a schematic block diagram of an example end-user device (such as user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can include computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 994) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 810, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
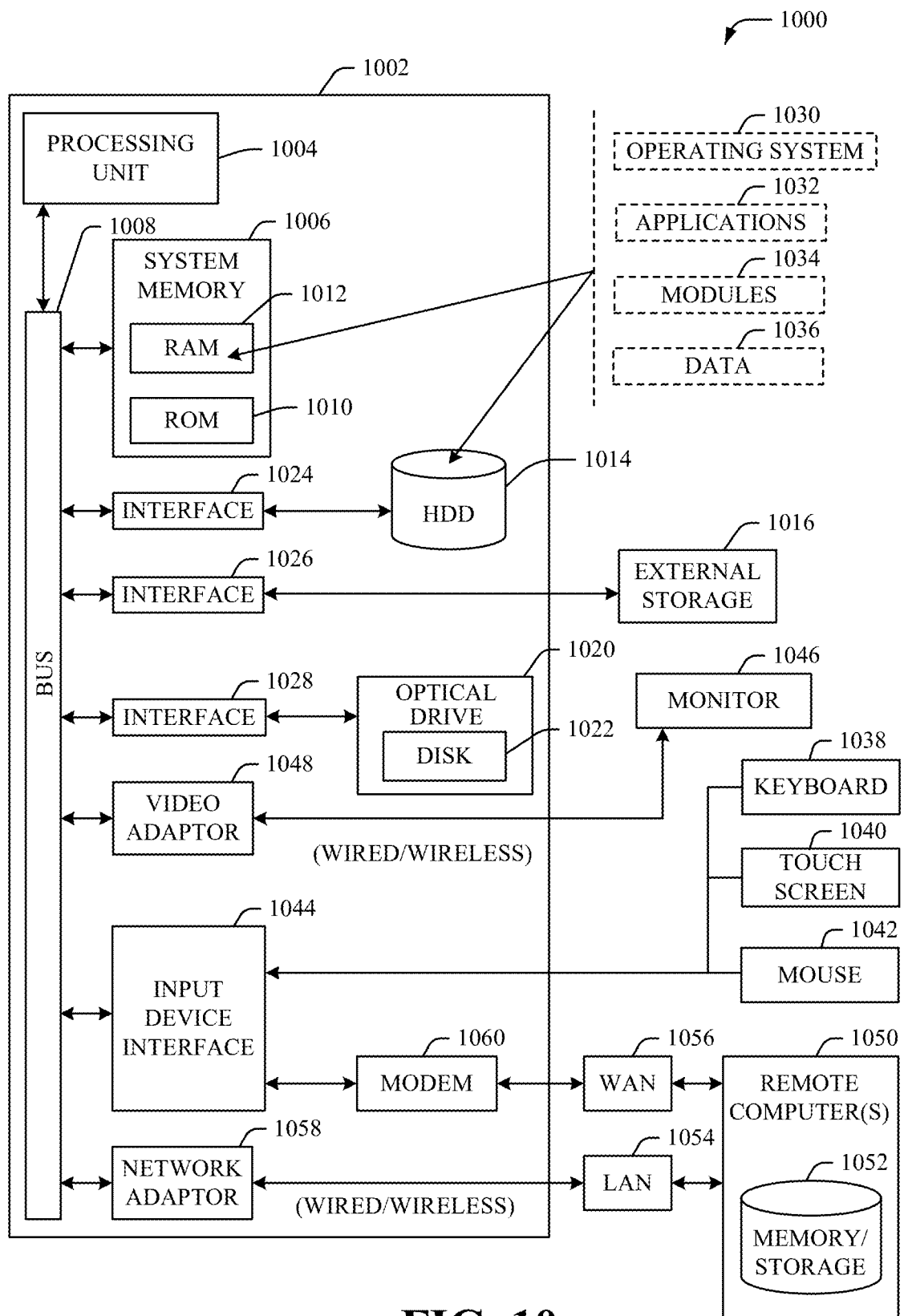
FIG. 10 illustrates an example block diagram of an example computer/machine system operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD), non-volatile memory and other storage technology could be used in addition to, or in place of, an HDD 1014, and can be internal or external. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally include emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can include one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 994 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 8 GHz radio bands, at an 10 Mbps (802.11b) or 84 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to include, without being limited, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments include a system as well as a computer-readable medium having computer-executable instructions for performing the acts and/or events of the various methods.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communications media include wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A system, comprising:
    a processor; and
    a memory that stores executable instructions that, when executed by the processor of the system, facilitate performance of operations, the operations comprising:
        retrieving a first system information block (SIB) data structure, the SIB data structure including information about a group of neighbor cells in a communication network;
        determining whether a neighbor cell of the group of neighbor cells is a bandwidth reduced mode cell capable of supporting a bandwidth reduced mode, the bandwidth reduced mode including selectively, temporarily reducing bandwidth usage by the neighbor cell of the group of cells;
        in response to determining that the neighbor cell of the group is capable of supporting the bandwidth reduced mode, filtering information of the first SIB data structure by mapping the first SIB data structure to a bandwidth reduced mode neighbor cell data structure, wherein the mapping comprises copying neighbor cell information of the neighbor cell to the bandwidth reduced mode neighbor cell data structure, the bandwidth reduced mode neighbor cell data structure including a subset of cells of the group of neighbor cells and wherein the mapping further comprises excluding, from the bandwidth reduced mode neighbor cell data structure, information about neighbor cells of the group of neighbor cells that do not support the bandwidth reduced mode; and
        communicating the bandwidth reduced mode neighbor cell data structure to a bandwidth reduced mobile device for use by the bandwidth reduced mobile device when connecting to a neighbor cell of the subset of the group of neighbor cells to thereby reduce use of network bandwidth by the bandwidth reduced mobile device.

2. The system of claim 1, wherein the mapping the first SIB data structure to the bandwidth reduced mode neighbor cell data structure comprises mapping the first SIB data structure to a bandwidth reduced system information block.

3. The system of claim 1, wherein the bandwidth reduced mode neighbor cell data structure comprises at least one of: a system information block 4 bandwidth reduced data structure or a system information block 5 bandwidth reduced data structure.

4. The system of claim 1, wherein the determining whether the neighbor cell of the group of neighbor cells is capable of supporting the bandwidth reduced mode comprises evaluating a bandwidth reduced mode capability indicator in capability data associated with the neighbor cell.

5. The system of claim 4, wherein the operations further comprise obtaining the bandwidth reduced mode capability indicator as part of an automatic neighbor relation (ANR) procedure of the communication network, including receiving from user equipment (UE) information about one or more detected neighbor cells detected by the UE and whose neighbor cell information has been received by the UE.

6. The system of claim 1, wherein the determining whether the neighbor cell of the group of neighbor cells is capable of supporting the bandwidth reduced mode comprises querying the neighbor cell.

7. The system of claim 1, wherein the mobile device is a long term evolution category m mobile device.

8. A method, comprising:
obtaining, by network equipment comprising a processor, a first data structure comprising neighbor cell information of neighbor cells listed in the first data structure;
transmitting, by the network equipment, a query to one or more neighbor cells, the query regarding support for a bandwidth reduced mode at a respective neighbor cell of the one or more neighbor cells, the bandwidth reduced mode corresponding to selectively, temporarily reduced bandwidth usage by the respective neighbor cell;
receiving, from the one or more neighbor cells, a response to the query, the response including an indication of support for the bandwidth reduced mode by the respective neighbor cell;
mapping, by the network equipment, the first data structure into a second, bandwidth reduced data structure, wherein the mapping comprises copying to the second, bandwidth reduced data structure a first group of neighbor cell information of bandwidth reduced mode neighbor cells listed in the first data structure capable of supporting the bandwidth reduced mode based on the indication of support for the bandwidth reduced mode from the respective neighbor cell, and excluding from the second, bandwidth reduced data structure a second group of neighbor cell information of neighbor cells listed in the first data structure that are not capable of supporting the bandwidth reduced mode; and
communicating, by the network equipment, the second, bandwidth reduced data structure to a bandwidth reduced mobile device for use by the bandwidth reduced mobile device when connecting to a neighbor cell to thereby reduce use of network bandwidth by the bandwidth reduced mobile device.

9. The method of claim 8, wherein the mapping the first data structure into the second, bandwidth reduced data structure comprises evaluating neighbor cell bandwidth reduced capability data of the neighbor cells listed in the first data structure.

10. The method of claim 9, further comprising obtaining, by the network equipment, the bandwidth reduced capability data of the neighbor cells listed in the first data structure as part of an automatic neighbor relation (ANR) procedure, including receiving from user equipment (UE) information about one or more detected neighbor cells detected by the UE and whose neighbor cell information has been received by the UE.

11. The method of claim 8, wherein the mapping of the first data structure into the second, bandwidth reduced data structure comprises evaluating respective bandwidth reduced capability indicators of respective neighbor cells listed in the first data structure.

12. The method of claim 11, further comprising obtaining, by the network equipment, the bandwidth reduced capability data of the neighbor cells listed in the first data structure as part of an automatic neighbor relation (ANR) procedure, including receiving from user equipment (UE) information about one or more detected neighbor cells detected by the UE and whose neighbor cell information has been received by the UE.

13. The method of claim 8, further comprising querying, by the network equipment, the neighbor cells listed in the first data structure to obtain respective bandwidth reduced capability data of respective neighbor cells.

14. The method of claim 8, further comprising filtering of the first data structure into the second, bandwidth reduced data structure by mapping a system information block 4 data structure to a system information block 4 bandwidth reduced data structure.

15. The method of claim 8, wherein the mapping of the first data structure into the second, bandwidth reduced data structure corresponds to mapping a system information block 5 data structure to a system information block 5 bandwidth reduced data structure.

16. A non-transitory machine-readable medium, comprising executable instructions that, when executed by a processor, facilitate performance of operations, the operations comprising:
transmitting, from a cell of a network to one or more neighbor cells, a query regarding support for a bandwidth reduced mode of operation at a respective neighbor cell of the one or more neighbor cells, the bandwidth reduced mode corresponding to selectively, temporarily reduced bandwidth usage by the respective neighbor cell;
receiving, from the one or more neighbor cells at the cell, a response to the query, the response including an indication of support for the bandwidth reduced mode by the respective neighbor cell;
mapping a first data structure comprising information of neighbor cells to a bandwidth reduced data structure, the mapping comprising, for respective neighbor cells listed in the first data structure,
selecting a respective neighbor cell listed in the first data structure;
determining whether the respective neighbor cell listed in the first data structure supports bandwidth reduced operation by selectively, temporarily reducing bandwidth usage during the bandwidth reduced operation;
in response to determining that the respective neighbor cell listed in the first data structure supports the bandwidth reduced operation, copying respective information from the respective neighbor cell to the bandwidth reduced data structure and excluding respective information of the respective neighbor cell in the bandwidth reduced data structure if the respective neighbor cell listed in the first data structure does not support the bandwidth reduced mode; and
communicating the bandwidth reduced data structure to a bandwidth reduced mobile device for use by the bandwidth reduced mobile device when connecting to a neighbor cell to thereby reduce use of network bandwidth by the bandwidth reduced mobile device.

17. The non-transitory machine-readable medium of claim 16, wherein the determining whether the respective neighbor cell listed in the first data structure supports the bandwidth reduced operation comprises evaluating a bandwidth reduced mode capability indicator associated with the respective neighbor cell.

18. The non-transitory machine-readable medium of claim 17, wherein the operations further comprise obtaining the bandwidth reduced mode capability indicator as part of an automatic neighbor relation (ANR) procedure of a communication network, including receiving from user equipment (UE) information about one or more detected neighbor cells of the communication network detected by the UE and whose neighbor cell information has been received by the UE.

19. The non-transitory machine-readable medium of claim 16, wherein the mapping of the first data structure comprises mapping a system information block 4 data structure to a system information block 4 bandwidth reduced data structure.

20. The non-transitory machine-readable medium of claim 16, wherein the mapping of the first data structure comprises mapping a system information block 5 data structure to a system information block 5 bandwidth reduced data structure.

* * * * *